Aug. 30, 1938.  F. E. RICE  2,128,473
TAP CONSTRUCTION
Filed March 26, 1937
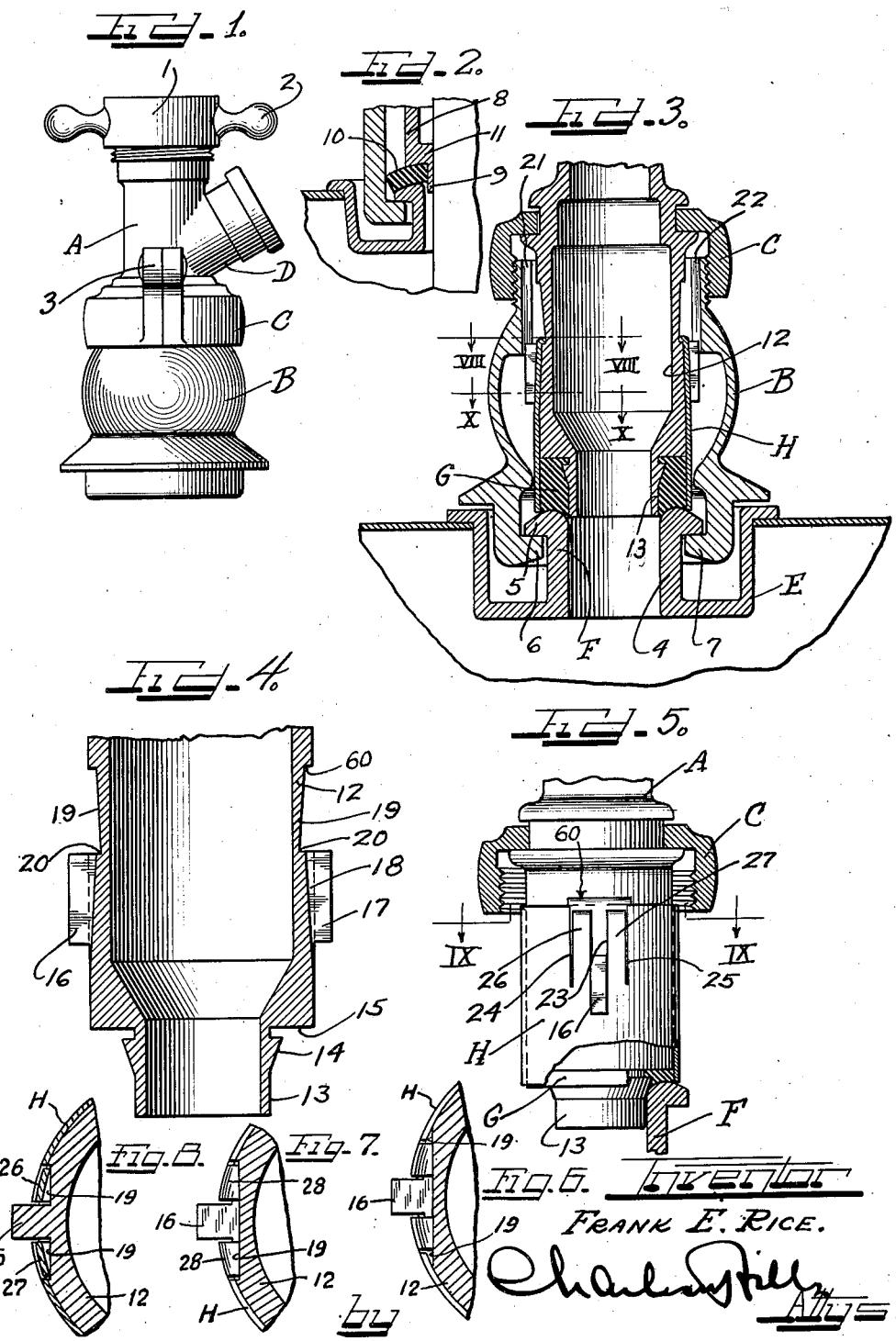
Inventor
FRANK E. RICE.
by Charles Still
Attys.

Patented Aug. 30, 1938

2,128,473

UNITED STATES PATENT OFFICE 2,128,473

TAP CONSTRUCTION

Frank E. Rice, Detroit, Mich., assignor to American Tap-Bush Company, Detroit, Mich., a corporation of Delaware Application March 26, 1937, Serial No. 133,133

5 Claims. (Cl. 285—40)

The present invention relates to tap construction and more particularly to a construction in which the sealing washer used between a tap and a tap bush is given prolonged life.

In connection with the dispensing of beer from barrels by means of taps applied to the barrels, it has been found that the usual practice for bartenders, when connecting taps to barrels, has been to use mallets for striking the ears or handles of the coupling rings of the taps to tighten the taps against the tap bushes in leak tight relationship. Such practice results in destruction to the sealing washer as undue pressure is applied thereto when mallets are used for tightening the taps to bushes. Whenever such washers become damaged to such extent as to become ineffective to properly seal a tap to a bush, the bartender, or other tap user instead of replacing the worn washer sends the tap to the tap manufacturer for replacement of the washer. It has been found that users of many taps, as in large saloons, tap rooms, hotels and the like, whenever the washers are prematurely worn out by the above mentioned practice of the bartenders, sometimes discard the taps of a particular manufacturer and supplant them by taps of another manufacturer thus putting the blame on the tap manufacturer which properly belongs to the user.

In the taps in use at the present time, the sealing washers employed are usually flat, substantially thin rubber or rubber composition and are normally carried surrounding the reduced end portion of the tap body and retained against loss by the inwardly projecting lugs on the connector of the tap. Usually the washers are loose, when the taps are removed from barrels, and if perchance the washers should have been damaged to an extent where the diameters thereof be reduced, then when such taps are removed from barrels, the washers become lost.

Taps for beer barrels are at present so constructed as to be effectively connected to a tap bush in leak tight relation simply by hand pressure applied to the coupling rings of the taps. However, bartenders as a rule prefer to use mallets to drive the coupling rings beyond the points at which they may be tightened by hand, thus shortening the usefulness of the sealing washers, as by such abnormal tightening the washers are crushed, or become damaged to an extent where their effectiveness for sealing purposes is prematurely ended.

The present invention is directed to a tap construction wherein the sealing washer is carried by a tap in such manner as to be at all times retained on the tap and even when worn still retained on the tap against loss.

An object of the present invention is to provide a tap construction wherein the usual flat thin washer may be eliminated and a washer of greater axial thickness used, to prolong the washer's life even when a tap may be connected to a barrel by undue pressure, applied, as for instance, by use of a mallet for tightening the coupling ring of the tap.

Another object of the present invention is to provide, in a tap construction, arrangement of a sealing washer which is prevented from radial displacement as axial pressure is applied to it, so that even though the washer wears away on its face which contacts the bush switch, there is left sufficient washer body to effectively seal the connection between the tap and the bush and thus prolong the usefulness of the washer beyond that possible with the usual thin washers in use at the present time.

A further object of the present invention is to provide a tap construction wherein the life of the sealing washer is prolonged.

A still further object of the present invention is to provide a tap construction wherein the sealing washer is restrained against radial spread regardless of the amount of axial pressure applied to the washer connecting a tap to a bush.

The invention has for a further object a tap construction wherein a sealing washer is confined within a skirt or sleeve to prevent radial spread of the washer in use.

A still further object of the present invention is to provide a tap construction wherein a skirt or sleeve is movable axially along the tap casing to compensate for washer wear in use, and still impose restraint against outward radial spread of the washer.

The invention has for a still further object the provision of a tap construction wherein a sealing washer is carried by a portion of the tap casing and wherein radial spread of the washer is prevented as the tap is tightened against the bush.

The above, other and further objects of the present invention will be apparent from the following description and accompanying drawing.

Embodiments of the present invention are illustrated in the accompanying drawing and the views thereof are as follows:

Figure 1 is a side elevational view of a tap constructed in accordance with the present invention.

Figure 2 is a fragmental sectional view showing a tap and sealing washer of the type in use at the present time, connected to a tap bush, and showing the relationship of the parts when the tap is tightened against such bush.

Figure 3 is an axial central section through the tap of Figure 1 showing it attached to a bush of common type.

Figure 4 is a fragmental axial sectional view through a portion of the casing of the tap of Figure 1.

Figure 5 is a fragmental view, partially in elevation and partially in section, showing a tap constructed in accordance with the present invention and utilizing a movable sleeve for surrounding the sealing washer, showing the washer worn, and the sleeve at its limit of retrograde movement, which movement is occasioned by wear of the sealing washer.

Figure 6 is an enlarged fragmental transverse sectional view taken substantially in the plane of line VIII—VIII of Figure 3.

Figure 7 is an enlarged fragmental transverse sectional view taken substantially in the plane indicated by line IX—IX of Figure 5.

Figure 8 is an enlarged fragmental transverse sectional view taken substantially in the plane of line X—X of Figure 3.

The drawing will now be explained:

The tap of Figure 1 is, as to outward appearances, that of a well known form and includes a body A, a connecter B and a coupling ring C, as well as a lateral connection D to which may be connected a hose for supplying air or gas pressure to the interior of a barrel. The upper end of the body A is provided with a nut 1, having handles 2 thereon, which serves to compress a washer disposed in a recess in the upper end of the body for clamping a draught tube in the tap, as is common practice.

The coupling ring C is provided with outstanding ears 3 whereby the ring may be rotated to connect or disconnect the connecter D from a tap bush E.

In the construction of tap bushes, there is provided a so-called "switch" F which comprises a cylindrical wall 4 defining an opening for the reception of a draught tube. The upper end of the wall is outturned to provide a flange 5, which is notched at opposite points, and with which flange inwardly directed lugs 6 and 7 on the connecter engage to connect the tap to the bush.

The connecter is tightened against the bush by rotation of the coupling ring C in proper direction so that the lower end of the tap is clamped tightly against the switch of the bush, in leak tight relationship.

In order to seal this connection, a sealing washer is utilized. Figure 2 shows a tap construction of well known type in use at the present time, in which the lower end of the casing 8 of the tap body is provided with an end extremity 9 of reduced external diameter and about which is carried a sealing washer 10, which is normally flat and relatively thin. This washer is made of rubber or rubber composition or other suitable material.

The extremity of the casing 8 is undercut at 11 to conform substantially to the contour of the upper margin of the switch of the bush so when the tap is tightened against the bush the washer is given a substantially spherical shape to thus increase the sealing effect between the tap and the bush.

Whenever a bartender utilizes a mallet to rotate the coupling ring C beyond the point to which it may be rotated by hand pressure to the ears 3, the washer 10 is squeezed to an extent where it sometimes crumbles. Sometimes the abnormal pressure so created is sufficient to cut the washer in line with the outer surface of the lower end of the casing 8 and in a short time such washer becomes ineffective to properly seal the joint between a tap and bush.

The casing 12, of the present invention, and as illustrated in Figures 3, 4 and 5, has an end portion 13 of reduced diameter with a tapered portion 14, which diverges upwardly and which terminates a short distance below the end extremity 15 of the major portion of the casing.

Projecting in opposite directions from the outer surface of the casing are lugs 16 and 17, the longer dimension of the lugs extending in the direction of the axial length of the casing. Adjacent the lugs, the outer surface of the casing is flattened or grooved to provide a bottom or an inwardly directed inclined portion 18 extending upwardly from the lower extremities of the lugs and terminating adjacent the upper extremities of the lugs.

Above the lugs, the casing is fashioned with flat inclined surfaces or grooves 19 which diverge upwardly and at their lower ends terminate in notches 20 which are cut inwardly from the general cylindrical surface of the casing beyond the maximum incline of the lower inclined surfaces 18. For surrounding the lower extremity 13 of the casing of the tap, a sealing washer G is provided, the outer surface of which is cylindrical and the inner surface of which is fashioned to conform to the exterior shape of the end portion 13 and the inclined surface 14 as well as the notch formed between the inclined surface and the adjacent extremity 15 of the casing.

Figure 3 shows a section of the sealing ring G.

In order to prevent rotative movement of the connecter as the coupling ring is being tightened or loosened, the connecter is provided with grooves or guideways 21 and 22 for receiving the lugs 16 and 17 of the casing of the tap. The lugs and the guideways are long enough so that there is engagement between the lugs and guideways irrespective of the relationship between the connecter and the coupling ring when the ring and connecter are threaded together in operative relation.

Utilizing a sealing ring G of the character herein described, it is obvious that unless restraint were applied to the outer surface of the ring then when axial pressure were applied to connect a bush to a tap, the washer might bulge outwardly and prevent establishment of a leak tight seal between the tap and bush.

In order to restrain outward spread of the sealing washer G, various means may be provided: The form illustrated in Figures 3, 4 and 5 for preventing outward spread of the sealing washer G consists of a cylindrical sleeve, or retaining element, H which is slidable over the exterior of the casing 12 of the tap and which is provided with slots 23 extending inwardly from the upper end of the sleeve so that the sleeve may pass the lugs 16 and 17. On each side of the slots 23, the sleeve is slitted at 24 and 25 thereby providing fingers 26 and 27 respectively with one finger on one side of a lug and the other finger on the opposite of the lug. These fingers are bent inwardly of the cylindrical surface of the sleeve H, and the free end of the fingers are inturned as at 28 in Figure 9 and with the extremities of the inturned ends riding on the inclined surfaces or bottoms of the grooves 19. The purpose of the engagement of the inturned ends 28 of the fingers 26 and 27 against the sloping or inclined surfaces 19 is to create friction between the sleeve H and the casing 12 to prevent ready displacement, or retrograde movement, of the sleeve as the washer becomes worn in use.

The sleeve H, when a new washer G is installed, is in the position shown in Figure 3, that is with the inturned end 28 of the fingers 26 and 27 engaging the notches 20 in the casing. This is the limit of downward movement of the sleeve.

The parts are so proportioned that when a new washer G is in place the sleeve H occupies the position shown in Figure 3.

When a tap is applied to a bush, and the connecter lugs 6 and 7 engaged underneath the flange 5 of the "switch," and the coupling ring C tightened, the extremity of the reduced end 13 of the casing enters, slightly, the tube receiving opening in the "switch," and the washer G is tightened against the flange of the "switch." Such tightening of the tap against the bush causes deformation of the lower face of the washer as is shown in Figure 3. As the washer G is compressed axially by tightening of the connecter to the bush, the lower margin of the sleeve H will rest against the "switch" and perhaps be shifted slightly upwardly. Any shift of the sleeve H upwardly will cause the inturned ends 28 of the fingers 26 and 27 to ride on the divergent surfaces 19 and thus resistance to upward movement of the sleeve is resisted in increasing order.

As the washer becomes worn, subsequent applications of the tap to a bush will cause corresponding upward or retrograde movement of the sleeve H until such time as the washer is worn to a point where its renewal is essential. By the time the washer has worn so thin as to lose its effectiveness for sealing purposes, the sleeve H has ridden up the inclined surfaces 19 until the inturned ends 28 of the fingers bear against undercut portions or shoulders 60 formed in the outer surface of the casing at the upper ends of the inclined surfaces or grooves 19.

The inclination of the surfaces 19 and the extent of the inturned ends 28 of the fingers is such that at no time do any part of the fingers 26 and 27 project outwardly of the cylindrical surface of the sleeve. This is for the purpose of permitting removal of the connecter from the tap casing and also the application of the connecter to the tap casing, after separation.

Normally, when the sleeve H is in its lowermost position, which is that when the washer G is new, the fingers lie against the sloping faces 19 with the inturned ends 28 engaged in the notches 20.

It will thus be observed that in this form of the invention the face of the washer G which contacts the switch of the bush may wear away in use. However, the construction is such that satisfactory sealing is accomplished as the washer is confined against outward spread by reason of the sleeve H. The arrangement of the sleeve H in a manner to slide on the casing of the tap enables the sleeve to accommodate its position to the degree of wear of the washer G.

Figure 5 shows condition of the washer G when almost at a point where it is too thin, axially, to efficiently seal the joint between the tap and the bush. There is, however, enough of the washer between the casing and the switch to seal the joint. After the washer has been worn slightly thinner than is shown in Figure 5, it may be removed and a new washer applied whereupon the sleeve H is then pulled downwardly over the new washer to its normal position which is that shown in Figure 3.

It will be observed that the present invention provides a tap construction wherein added or prolonged life is given to the sealing washer employed to effect a leak tight connection between a tap and its bush.

The construction is such that even though abnormal pressure is applied to the tap to tighten the tap against its bush and thereby abraid or otherwise mutilate the sealing washer, nevertheless, the sealing washer is maintained in such a condition as to effect leak tight seal between the tap and bush until the washer has been worn so thin as to make it necessary for removal and the substitution of a new washer.

The construction of the tap of the present invention is such that any bartender or other user of a tap of this invention may readily apply a new washer whenever an old one has been worn so thin as to be of no further use.

The invention has been described herein more or less precisely as to details, yet it is to be understood that the invention is not to be limited thereby, as changes may be made in the arrangement and proportion of parts and equivalents may be substituted without departing from the spirit and scope of the invention.

The invention is claimed as follows:

1. A beer barrel or like tap having the usual connector and threaded coupling ring for connecting the tap to a bush and carrying a sealing washer, characterized by a sleeve shiftable on the tap when the latter is connected to its bush and surrounding the washer to prevent radial spread of the washer when the tap is tightened against a bush by rotation of the coupling ring, said sleeve being shiftable along the tap to adapt itself to wear of the washer in service, and said sleeve and tap having cooperating means offering frictional resistance to the shifting of the sleeve.

2. A beer barrel or like tap having the usual connecter and threaded coupling ring for connecting the tap to a bush and having a casing carrying a sealing washer on the end thereof that cooperates with the bush switch, characterized by the provision of a sleeve surrounding the casing and said washer to prevent radial spread of the washer in service, the diameter of the sleeve being such that the sleeve contacts the bush switch when the tap is connected to a bush and is movable along said casing in retrograde direction as the washer wears and becomes reduced in axial thickness by reason of such contact and when the tap is again connected to a bush to thereby compensate for washer wear while still maintaining its restraining effect against radial spread of the washer, and further characterized by provision of an inclined surface portion in said casing and a detent portion of said sleeve engaging said surface portion, the engagement of said detent against said inclined surface offering resistance to retrograde movement of said sleeve to assure sufficient surface engagement between said sleeve and washer for restraining said washer against radial spread regardless of the amount of wear suffered by said washer.

3. A tap construction including a casing having a reduced end for cooperating with the switch of a tap bush, a sleeve about said casing and its reduced end defining a space for receiving a washer, and a sealing washer within said space, said sleeve being movable along said casing to compensate for wear of the washer in use, said sleeve and casing having cooperating means to retard movement of said sleeve and thus maintain said sleeve in position to prevent radial spread of the washer regardless of the axial thickness of the washer.

4. A beer barrel or like tap having the usual connecter and threaded coupling ring for connecting the tap to a bush and having a casing carrying a sealing washer on the end thereof that cooperates with the bush switch, characterized by the provision of a sleeve surrounding the washer to prevent radial spread of the washer when the tap is tightened to its bush by rotation of said coupling ring, and further characterized by the fact that the sleeve is movable along said casing in retrograde direction by contact of an end thereof against the bush switch as said washer wears and the coupling ring is manipulated to take up any slack occasioned by such wear to thereby maintain full surface engagement between said washer and the bush switch and to maintain restraint against radial spread of the washer regardless of the amount of wear suffered by said washer within the limits of its axial thickness, said casing being provided with a groove having an inclined bottom extending in the direction of the length of the casing, and the sleeve being provided with a detent frictionally engaging the bottom of the groove to resist movement of the sleeve in retrograde direction.

5. A beer barrel or like tap having the usual connecter and threaded coupling ring for connecting the tap to a bush and having a casing carrying a sealing washer on the end thereof that cooperates with the bush switch, characterized by the provision of a slidable sleeve surrounding and frictionally engaging the casing and surrounding said washer to prevent radial spread of the washer in service, the diameter of the sleeve being such that the sleeve contacts the bush switch when the tap is connected to a bush and is movable along said casing in retrograde direction as the washer wears and becomes reduced in axial thickness by reason of such contact and when the tap is again connected to a bush to thereby compensate for washer wear while still maintaining its restraining effect against radial spread of the washer, said sleeve having a part deflected out of its surface contour and in contact with the tap to offer frictional resistance to retrograde movement of the sleeve.

FRANK E. RICE.